US008356702B2

(12) United States Patent
Manschitz et al.

(10) Patent No.: US 8,356,702 B2

(45) Date of Patent: Jan. 22, 2013

(54) OSCILLATION DAMPER FOR A HAND-HELD POWER TOOL

(75) Inventors: Erwin Manschitz, Germering (DE); Franz Mössnang, Landsberg (DE)

(73) Assignee: Hilti Aktiengesellschaft, Schaan (LI)

( * ) Notice: Subject to any disclaimer, the term of this patent is extended or adjusted under 35 U.S.C. 154(b) by 822 days.

(21) Appl. No.: 12/012,056

(22) Filed: Jan. 30, 2008

(65) Prior Publication Data

US 2008/0179797 A1 Jul. 31, 2008

(30) Foreign Application Priority Data

Jan. 31, 2007 (DE) ......................... 10 2007 000 057

(51) Int. Cl.
*F16F 7/10* (2006.01)

(52) U.S. Cl. ......................... 188/380; 188/378; 188/379

(58) Field of Classification Search ........... 188/378–380
See application file for complete search history.

(56) References Cited

U.S. PATENT DOCUMENTS

| | | | | |
|---|---|---|---|---|
| 1,547,774 | A * | 7/1925 | Prellwitz | 173/162.2 |
| 1,845,825 | A * | 2/1932 | Benedict | 173/162.2 |
| 1,874,039 | A * | 8/1932 | Griswold | 74/574.3 |
| 3,525,887 | A * | 8/1970 | Ewart, Jr. | 310/27 |
| 3,845,827 | A * | 11/1974 | Schulin | 173/162.1 |
| 3,939,923 | A * | 2/1976 | Aldag et al. | 173/162.1 |
| 4,238,104 | A * | 12/1980 | Hamilton | 248/566 |
| 4,478,293 | A * | 10/1984 | Weilenmann et al. | 173/162.2 |
| 4,991,698 | A * | 2/1991 | Hanson | 188/380 |
| 5,269,381 | A * | 12/1993 | Oscarsson | 173/162.2 |
| 5,615,664 | A * | 4/1997 | McDonald, Jr. | 124/89 |
| 6,123,350 | A * | 9/2000 | Suzuki | 280/124.108 |
| 6,364,078 | B1 * | 4/2002 | Parison et al. | 188/380 |
| 2005/0179178 | A1 * | 8/2005 | Cropelli | 267/137 |
| 2009/0025949 | A1 * | 1/2009 | Aoki | 173/162.1 |

FOREIGN PATENT DOCUMENTS

| | | | |
|---|---|---|---|
| JP | 2006062044 | A * | 3/2006 |
| WO | WO 2006022345 | A1 * | 3/2006 |

* cited by examiner

*Primary Examiner* — Bradley King
*Assistant Examiner* — Mahbubur Rashid
(74) *Attorney, Agent, or Firm* — Abelman, Frayne & Schwab

(57) ABSTRACT

An oscillation damper (3) which is designed for being mounted on a housing (2) of a hand-held power tool (1) and includes an oscillating damping mass (4); and at least one spring (5) located completely, with respect to its axial length, within the damping mass (4) for axially compressively pre-loading the damping mass (4) against the housing (2) of the power tool (1).

5 Claims, 2 Drawing Sheets

OSCILLATION DAMPER FOR A HAND-HELD POWER TOOL

BACKGROUND OF THE INVENTION

1. Field of the Invention

The present invention relates to an oscillation damper for a hand-held power tool and, in particular, a hammer drill, a combination hammer, or chisel hammer.

2. Description of the Prior Art

An oscillation damper represents an oscillation-capable sub-system that consists of an abstract oscillating mass, an abstract spring, and an abstract damper and that is not necessarily needed to be explicitly formed of concrete components. In particular, the abstract damper often is not formed by concrete components but nevertheless functions by using friction and flow losses which practically always present. There exist two types of dampers, conventional passive oscillation dampers that exclusively are self-excited, and actively controlled oscillation dampers.

By a suitable selection of spring constant and mass, in a passive damper, its natural frequency can be so dimensioned that it is closed to a to-be-damped interference frequency, in the present case, to the oscillations of the outer housing of the hand-held power tool.

French Publication FR 2,237,734 discloses use of a passive oscillation damper for preventing oscillation of a housing of a percussion hand-held power tool.

U.S. Pat. No. 4,478,293 discloses synchronization of operation of two passive oscillation dampers by using compressed air pulsation. Here, an abstract spring, which is formed as a helical spring, is oriented axially in the percussion direction of the power tool and is at least partially axially offset to a compact oscillating damping mass.

European Publication EP 1 710 052 discloses an arrangement of a hollow cylindrical passive oscillation damper around of a guide tube of a percussion mechanism.

International Publication WO 2006/022345 discloses an arrangement of a compact oscillation damper within the outer housing of a power tool on the housing side opposite the handle.

According to European Publication EP 1 415 768, an oscillation damper is located in a damper housing that is releasably form- or forcelockingly secured on remaining outer housing of the hand-held power tool, on a side surface of the housing remote from the handle and opposite thereto.

According to German Patent No. 815,179, two, compressively preloaded, helical springs are provided on opposite axial sides of a compact oscillating damping mass.

Because the total length of an oscillation damper is always greater than the spring length, for achieving a sufficient damping effect a relatively large, axially extending constructional space is required.

An object of the present invention is to reduce the total length of an oscillation damper suitable for being mounted in or on a hand-held power tool.

SUMMARY OF THE INVENTION

This and other objects of the present invention, which will become apparent hereinafter, are achieved by providing, on an inwardly located housing side (e.g., of a gearbox cover) or outwardly located housing side (e.g., outer housing) of a power tool housing, an oscillation damper designed for being mounted on the housing and including an oscillating damping mass and at least one spring located completely, with respect to its axial length, within the damping mass for axially compressively preloading the damping mass against the housing of the power tool.

With the arrangement of the preloading spring entirely within the damping mass, the total length of an oscillation damper is determined essentially by the length of the damping mass. Because, the damping mass length can be as large as possible, at the precisely predetermined length of an oscillation damper and spring constants, as small as possible natural frequency can be achieved. A further advantage of the inventive oscillation damper consists in that the inwardly located compressively preloaded spring can have, as a result of exchange of mass stops with respect to the oscillation amplitude of the damping mass, a spring excursion of half of a length of the spring excursion of two compressively preloaded springs arranged on both sides of the damping mass. This also reduce the preload the spring itself is subjected.

Advantageously, the oscillation damper is formed as a mirror-symmetrical element, whereby transverse oscillation is eliminated.

Advantageously, at least a major portion of the damping mass is arranged within a damper housing, whereby the oscillation-capable sub-system is protected from contamination.

Advantageously, the damping mass is axially displaceable within the damper housing, whereby the damping mass can freely oscillate axially until cessation of oscillations.

When two preloading springs are provided, advantageously, the damper housing forms two, axially spaced from each other, stops for each of the two springs and which are axially engaged by respective springs. The two stops limit the axial length of a respective spring from both sides.

Advantageously, when only one preloading spring is used, the damper housing forms two, axially spaced from each other, stops which lie in a mirror-symmetrical plane, which permits to retain the mirror-symmetry of the oscillation damper.

Alternatively, when exactly two preloading springs are provided, the damper housing forms exactly four stops, two pairs of axially spaced from each other, stops for the two springs, respectively. The two pairs of stops are arranged mirror-symmetrically in a mirror-symmetrical plane, which permits to retain the mirror symmetry of the oscillation damper.

With two preloading springs, advantageously, the damping mass can itself form two, axially spaced from each other, stops for each spring, whereby the springs alternatively engage, during oscillation, respective mass stops and become preloaded as a result. When only one preloading spring is used, the damping mass forms two, axially spaced from each other, stops which the spring engages.

Advantageously, a portion of the damping mass which encloses by the damper housing, is formed as a sector having a concave shape, with the concave sector being adapted to a convex upper housing side of the outer housing of a power tool.

Advantageously, the at least one spring is located in a pocket-shaped prismatic recess in the damping mass, whereby the damping mass is at least partially positively guided and, therefore, cannot break off transversely during a pulsating compression stress.

Advantageously, the damper housing is force and/or form-lockingly releasably secured on the housing of the power tool with fastening means, e.g., screws. Thereby the oscillation damper, if needed, can be easily mounted, e.g., on outer housing of a power tool that does not have an oscillation damper.

The novel features of the present invention, which are considered as characteristic for the invention, are set forth in the appended claims. The invention itself, however, both as to its construction and its mode of operation, together with additional advantages and objects thereof, will be best understood from the following detailed description of preferred embodiments, when read with reference to the accompanying drawings.

DETAILED DESCRIPTION OF THE PREFERRED EMBODIMENTS

Figure 1:
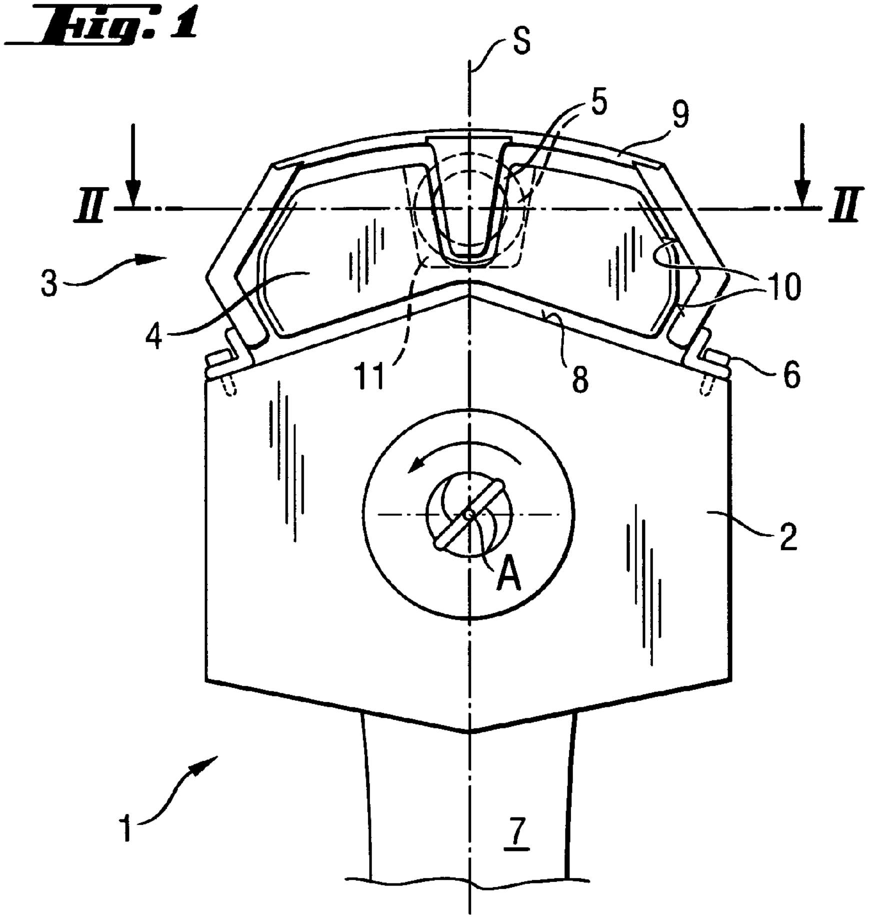
FIG. 1 a front view of a hand-held power tool together with an oscillation damper according o the present invention.

A hand-held rotary-percussion power tool 1, which is shown in FIG. 1, includes a housing 2 oscillating along a percussion axis A, and an oscillation damper 3 secured on the housing 2. The oscillation damper 3 has a damping mass 4 and a spring 5 that axially compressively preloads the damping mass 4 against the housing 2. The oscillating damper 3 is formed mirror-symmetrically with respect to a mirror-symmetrical plane S defined by the percussion axis A. The oscillating damper 3 is formlockingly releasably secured on the housing 2 with securing means 6 in form of screws on a convex upper housing side 8 opposite a handle 7. The damping mass 4, which is adapted to the housing side 8, is arranged in a damper housing 9 extending substantially in a plane transverse to the percussion axis A (up to a sector adjacent to the housing upper side 8), and is an axially displaceable thereon along guide surfaces 10 extending along the percussion axis A. The spring 5 is arranged in a prismatic pocket-shaped recess 11 in the damping mass 4 and which extends transverse to the percussion axis A and is open at its end side.

Figure 2:
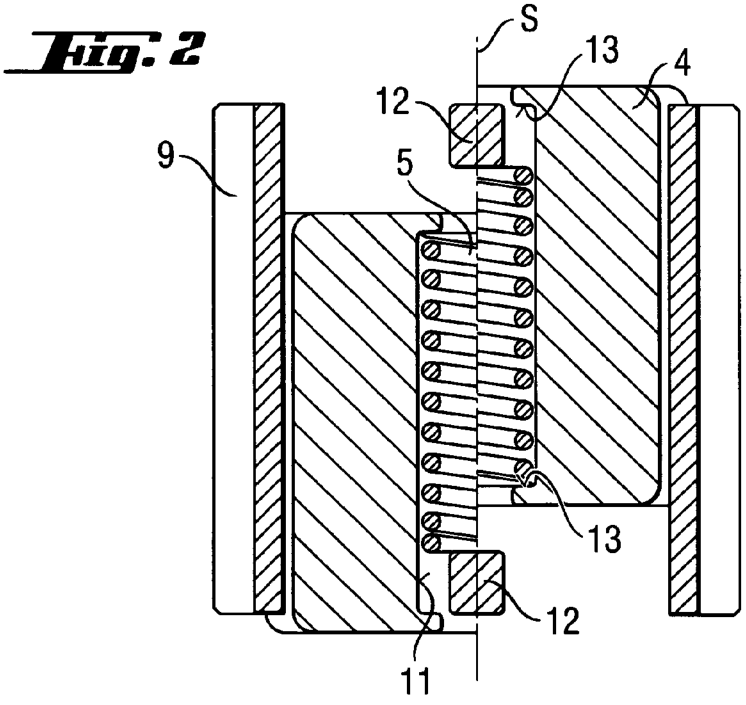
FIG. 2 a cross-sectional view along line II-II in FIG. 1.

As shown in FIG. 2, the spring 5, which is formed as a helical compression spring, is completely located, with respect to its axial length, within the damping mass 4. The damper housing 9 forms two axially spaced housing stops 12 for the spring 5 and which are located in the mirror-symmetrical plane S. The damping mass 4 forms, on opposite sides of the recess 11, respectively, two axially spaced, mass stops 13 which the spring 5 alternatively biasingly engages during oscillations (left and right sides in FIG. 2 show different oscillating conditions).

Figure 3:
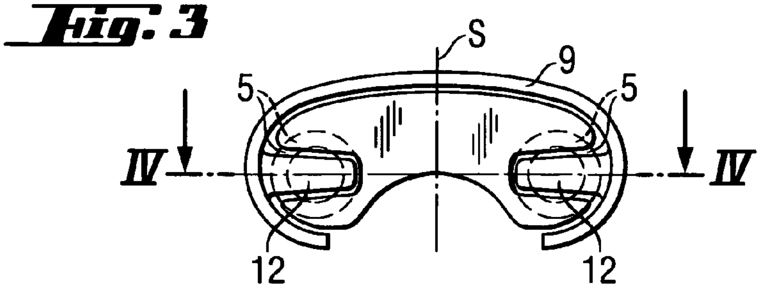
FIG. 3 a front view of another embodiment of an oscillation damper according to the present invention.
Figure 4:
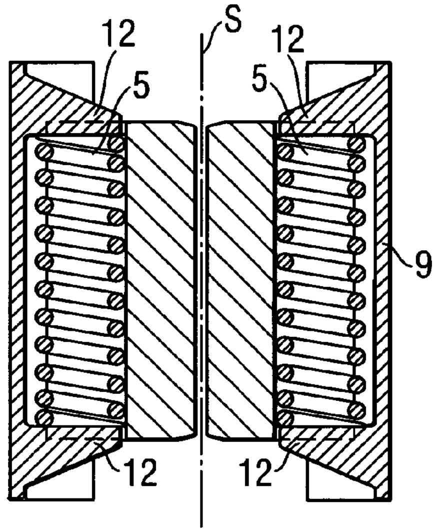
FIG. 4 cross-sectional view along line IV-IV in FIG. 3.

According to FIGS. 3-4, the damper housing 9 forms a pair of housing stops 12 on each of its opposite sides for each of two springs 5 and which a respective spring 5 axially engages. The two pairs of the housing stops 12 are located mirror-symmetrically with respect to the mirror-symmetrical plane S. To this end, the housing stops 12 projects radially inwardly transverse to the mirror-symmetrical plane S.

Figure 5:
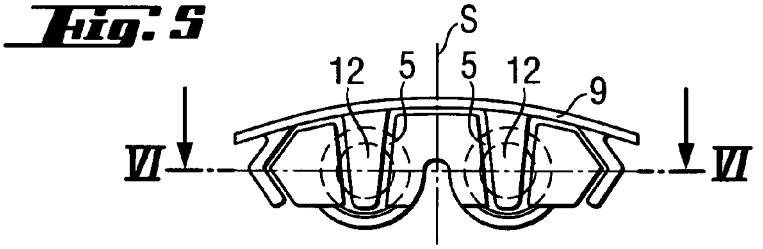
FIG. 5 a front view of yet another embodiment of an oscillation damper according to the present invention.
Figure 6:
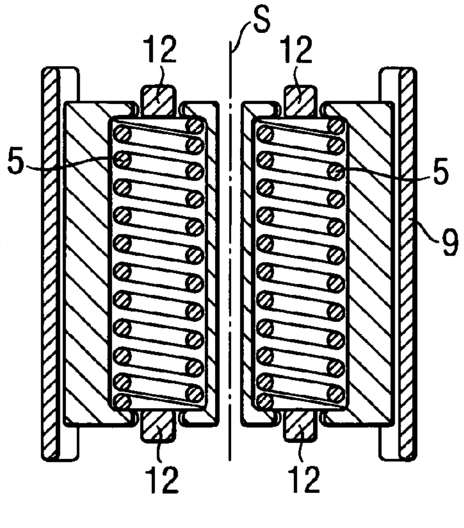
FIG. 6 a cross-sectional view along line VI-VI in FIG. 5.

In the embodiment shown in FIGS. 5-6, the housing stops 12 for two springs 5 project inwardly from the damper housing 9 parallel to the mirror-symmetrical plane S.

Though the present invention was shown and described with references to the preferred embodiments, such are merely illustrative of the present invention and are not to be construed as a limitation thereof and various modifications of the present invention will be apparent to those skilled in the art. It is therefore not intended that the present invention be limited to the disclosed embodiments or details thereof, and the present invention includes all variations and/or alternative embodiments within the spirit and scope of the present invention as defined by the appended claims.

What is claimed is:

1. An oscillation damper (3) for being mounted on a power tool housing (2) of a hand-held power tool (1), the oscillation damper (3) being formed as a mirror-symmetrical element having a mirror-symmetrical plane (5) and comprising a housing (9) for securing the damper (3) on the power tool housing (S); an oscillating damping mass (4) having at least a major portion thereof located within the damper housing (9); and at least one spring (5) completely located, with respect to an entire axial extent thereof, within the damping mass (4) and arranged between two, axially spaced from each other, first stops (13) which are provided in the damping mass (4), for preloading the damping mass (4) against the power tool housing (2) in an axial direction defined by a spring axis, wherein the damper housing (9) has two, axially spaced from each other, second stops (12) for the at least one spring, which are located in a mirror-symmetrical plan (S) of the mirror-symmetrical element, wherein one of the second stops (12) forms, with an axially opposite first stop (13), a first pair of stops, and another one of the second stops (12) forms with another one of the first stops (13), a second pair of stops, and wherein the at least one spring (5) is alternatively preloaded between the first and the second pairs of stops during oscillation of the damping mass.

2. An oscillation damper according to claim 1, wherein the damping mass (4) is axially displaceable within the damper housing (9).

3. An oscillating damper according to claim 1, wherein a portion of the damping mass (4) has a sector not enclosed by the damper housing (9) and having a concave shape.

4. An oscillation damper according to claim 1, wherein the at least one spring (5) is located in a pocket-shaped recess (11) formed in the damping mass (4) and having a prismatic cross-section.

5. An oscillation damper according to claim 1, wherein the damper housing (9) is releasably secured on the housing (2) of the power tool with securing means (6) at least one of force-lockingly or form-lockingly.

* * * * *